Aug. 20, 1935.   L. C. CLARKE   2,011,616
GREASE CUP
Filed July 31, 1933
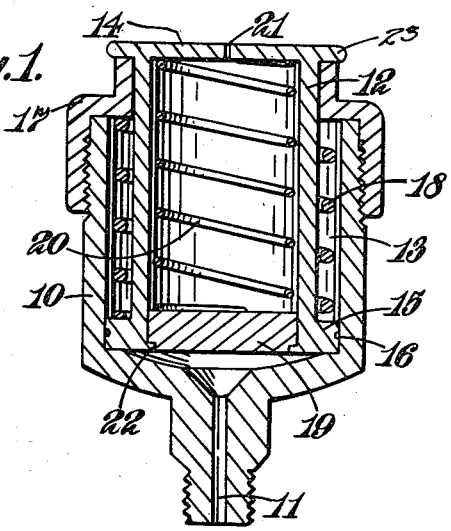
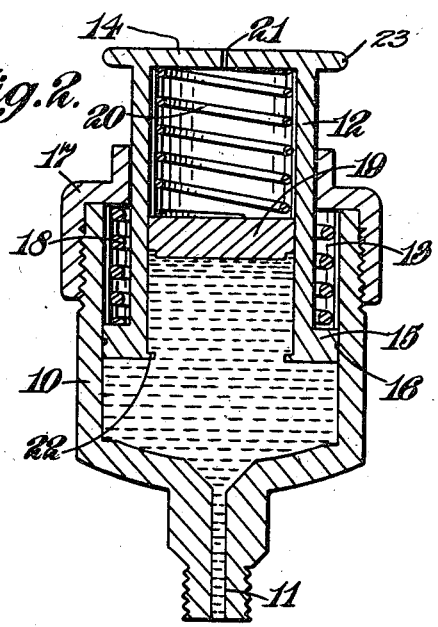
INVENTOR
Leveson Campbell Clarke
by his attorneys
Byrnes Stebbing Parmelee & Blenko Patented Aug. 20, 1935

2,011,616

UNITED STATES PATENT OFFICE 2,011,616

GREASE-CUP

Leveson Campbell Clarke, Firle, England, assignor to Automatic Lubrication Limited, Brighton, Sussex, England, a British company Application July 31, 1933, Serial No. 682,929
In Great Britain November 25, 1932

4 Claims. (Cl. 184—45)

This invention relates to grease-cups of the type in which the grease is expelled by means of a spring-controlled hollow piston member having within it a spring-controlled plunger which assists in the expulsion of the grease.

The object of the present invention is to provide a grease-cup of the aforesaid type from which the grease will be expelled in a very steady and even manner.

The invention will now be described with reference to the accompanying drawing in which:—

Figure 1 is a section of the grease-cup when empty, and

Figure 2 is a similar section of the cup in a partially charged condition.

The grease-cup shown on the drawing comprises a cylindrical grease container 10 having at its lower end a screw-threaded discharge nipple 11. Arranged within the container 10 is a hollow cylindrical inverted cup-shaped member 12 of smaller diameter than the interior of said container so as to provide an annular space 13 between them. The member 12 has at its upper end an end wall 14 but is open at its lower end. At the latter end, said member is provided with an outer flange 15 which is a sliding fit in the container 10, and serves as a piston. A peripheral groove 16 is provided in the flange 15 to facilitate the movement of the flange in the container. The annular space 13 is closed at the lower end by the flange 15 and at the upper end by a cap nut 17 which is screwed on to the container 10. A helical compression spring 18 is arranged in the annular space 13 and bears at one end against the flange 15 and at the other end against the cap nut 17. A grease-expelling plunger 19 fits slidably within the hollow member 12 but need not be a close fit therein. A second helical compression spring 20 is provided in the space between the plunger 19 and the end wall 14 of the hollow member 12, and a hole 21 is provided in said wall to permit air to escape from above the plunger. At the lower end of the hollow member 12, a stop or stops 22 are provided to form a seating for the plunger and retain it in said member when the grease cup is empty.

To charge the grease-cup, the cap nut 17 is unscrewed and the parts 12, 18, 19 and 20 are removed therewith as a unit from the grease container 10. To permit this, the inverted cup-shaped member 12 is provided at its closed end, after the parts have been initially assembled, with a flange 23 which prevents the screw cap from leaving the member 12. When the container has been charged, the foregoing parts are replaced and the cap nut 17 is screwed home. The plunger 19 is thus forced upwardly into the member 12 and the springs 18 and 20 are compressed.

When the grease-cup is in operation, the flange 15 on the member 12 and the plunger 19 both act to force out the grease, which transmits interacting pressure between them, and the plunger under the balancing action of the springs descends with a very steady movement. The member 12 likewise descends but more slowly. Eventually the parts attain the positions shown in Figure 1 in which the end wall 14 of the member 12 rests on the cap nut 17 and thus indicates that the container 10 is empty. The strength of the springs 18, 20 will be determined by the size of the cup and the nature of the grease intended to be used therein.

The progress of the discharge of the grease can be ascertained by the position of the member 12 the outer surface of which, if desired, may be graduated. In some circumstances, the grease cup acts most effectively if the outer end of the inverted cup-shaped member is completely closed and this is imperative if the cup is used under water. But in other cases and particularly if the temperature of the surrounding atmosphere is such as to cause a variation in the pressure of the air within the member 12 sufficient to increase or to reduce appreciably the effective pressure on the plunger 19, then better results are obtained if an aperture 21 is provided in the closed end of the member 12. This aperture should not be larger than is necessary to allow air to escape in order to prevent the admission of any appreciable quantity of foreign matter.

I claim:

1. In a grease cup of the type described comprising a container having a discharge outlet of small diameter relatively to the diameter of the container, the combination of an inverted cup-shaped member telescopically mounted in the container so as to leave an annular space between it and the container, which inverted cup-shaped member has at its lower end an external flange arranged to serve as a piston, a plunger in the inverted cup-shaped member, a ledge adjacent the open end of the cup-shaped member for limiting the travel of the plunger with respect to the cup-shaped member, a compression spring for controlling the plunger disposed within the inverted cup-shaped member between the end wall of that member and the plunger, a cap nut on the container for closing the upper end of the annular space between the inverted cup-shaped member and the container, a compression spring for controlling the inverted cup-shaped member disposed in said annular space, and a stop for said cap nut on the inverted cup-shaped member arranged so as to permit that member together with said closure, plunger and springs to be removed from the container as a unit.

2. In a lubricator, a container of uniform cross-section and open at the top and having a reduced discharge portion, an inverted cup-shaped member telescopically mounted in the container so as to leave an annular space between it and the container, an external flange at the lower end of said member, the outside diameter of the flange being substantially the same as the inside diameter of the uniform portion of the container, a plunger in the inverted cup-shaped member, a compression spring between the closed end of the member and the plunger, means to prevent the plunger from moving beyond the open end of the inverted cup-shaped member, a cap nut on the container for closing the upper end of the said annular space, and a compression spring in said annular space between the cap member and the external flange.

3. In a lubricator, a container of uniform cross-section and open at the top and having a reduced discharge portion, an inverted cup-shaped member telescopically mounted in the container so as to leave an annular space between it and the container, an external flange at the lower end of said member, the outside diameter of the flange being substantially the same as the inside diameter of the uniform portion of the container, a plunger in the inverted cup-shaped member, a compression spring between the closed end of the member and the plunger, a ledge adjacent the open end of the cup-shaped member for preventing the plunger from moving beyond the open end of the inverted cup-shaped member, a cap nut on the container for closing the upper end of the said annular space, and a compression spring in said annular space between the cap member and the external flange.

4. In a lubricator, a container of uniform cross-section and open at the top and having a reduced discharge portion, an inverted cup-shaped member telescopically mounted in the container so as to leave an annular space between it and the container, an external flange at the lower end of said member, the outside diameter of the flange being substantially the same as the inside diameter of the uniform portion of the container, a plunger in the inverted cup-shaped member, a compression spring between the closed end of the member and the plunger, a ledge adjacent the open end of the cup-shaped member for preventing the plunger from moving beyond the open end of the inverted cup-shaped member, and common means for adjusting the effective force of both springs when the lubricator is charged for operation.

LEVESON CAMPBELL CLARKE.